March 17, 1931.  E. JANSEN  1,796,691
PIPE COATING MACHINE
Filed May 28, 1930  2 Sheets-Sheet 1

INVENTOR.
Emil Jansen
BY Townsend, Loftus & Abbett
ATTORNEYS.

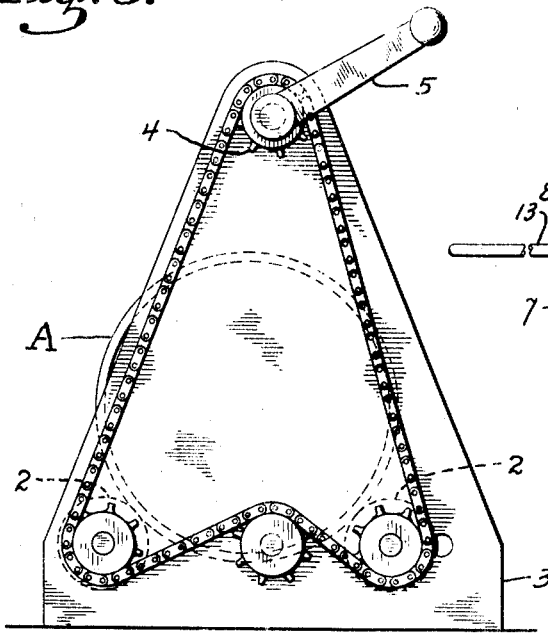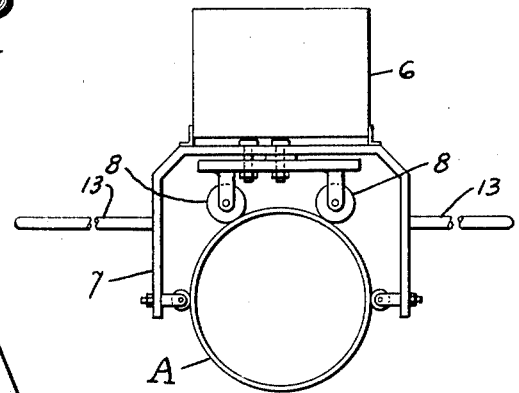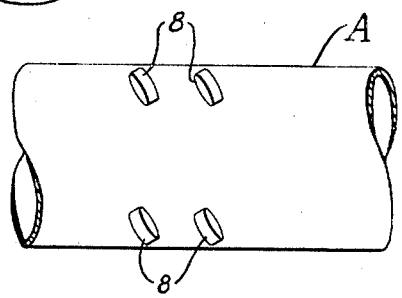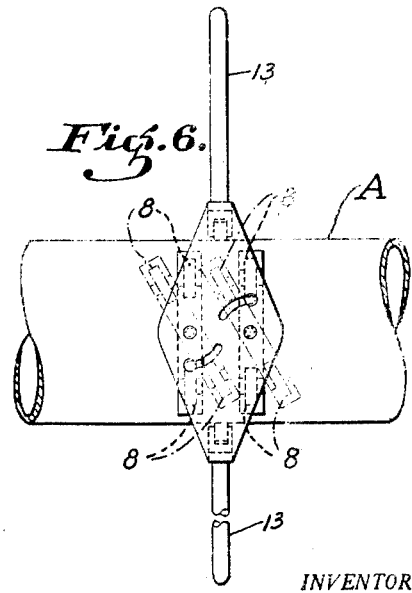

Patented Mar. 17, 1931

1,796,691

UNITED STATES PATENT OFFICE

EMILE JANSEN, OF SAN FRANCISCO, CALIFORNIA, ASSIGNOR TO GENERAL PAINT CORPORATION, OF SAN FRANCISCO, CALIFORNIA, A CORPORATION OF NEVADA

PIPE-COATING MACHINE

Application filed May 28, 1930. Serial No. 456,780.

This invention relates to apparatus for coating pipe with a suitable waterproofing or rust-resisting composition of plastic material like tar, asphaltum, etc.

The object of the invention is to provide a simple, practical and portable apparatus for coating pipe such as is used extensively in the oil fields for transporting gas and oil, and generally to be used wherever it is desired to coat pipe for use in underground mains.

Pipe is now generally wrapped and coated in the factory where large stationary machines may be set up and the work carried on automatically on a large scale. Such a wrapping machine is illustrated in the patent to Wieland and Jansen, Number 1,572,258, issued February 9, 1926. A good coating machine for doing this work on a large commercial scale is illustrated by the pending application of Wieland and Hubbell, Serial Number 281,054, filed May 28, 1928. It is frequently necessary, however, to treat pipe in the field where the terrain is rough and the difficulty of using any machine for the purpose is increased.

In the past it has been customary to apply the plastic coating, usually hot bitumen or asphalt, by means of a rag or brush, by hand, even where apparatus is available for temporarily supporting and revolving the pipe section.

The present coating and spreading apparatus is designed for use in conjunction with the pipe revolving machine shown and described in applicant's co-pending application Serial Number 387,353, filed August 21, 1929. By the present apparatus means are provided by which the hot plastic is distributed evenly over the pipe by mechanical means and the plastic carrier is moved forward automatically by the revolving of the pipe, the carrier being manually supported to maintain it in upright position.

Having reference to the accompanying drawings:

Fig. 3 is a sketch illustrating a suitable mechanism for revolving the pipe.

Fig. 4 is a diagrammatic plan view of the rollers by which the plastic carrier is supported on the pipe and made to travel longitudinally of the latter when the pipe is revolved.

Fig. 5 is a modification of the roller feed mechanism in end elevation.

Fig. 6 is a bottom plan view of the feed roller mechanism shown in Fig. 5.

Figure 1:
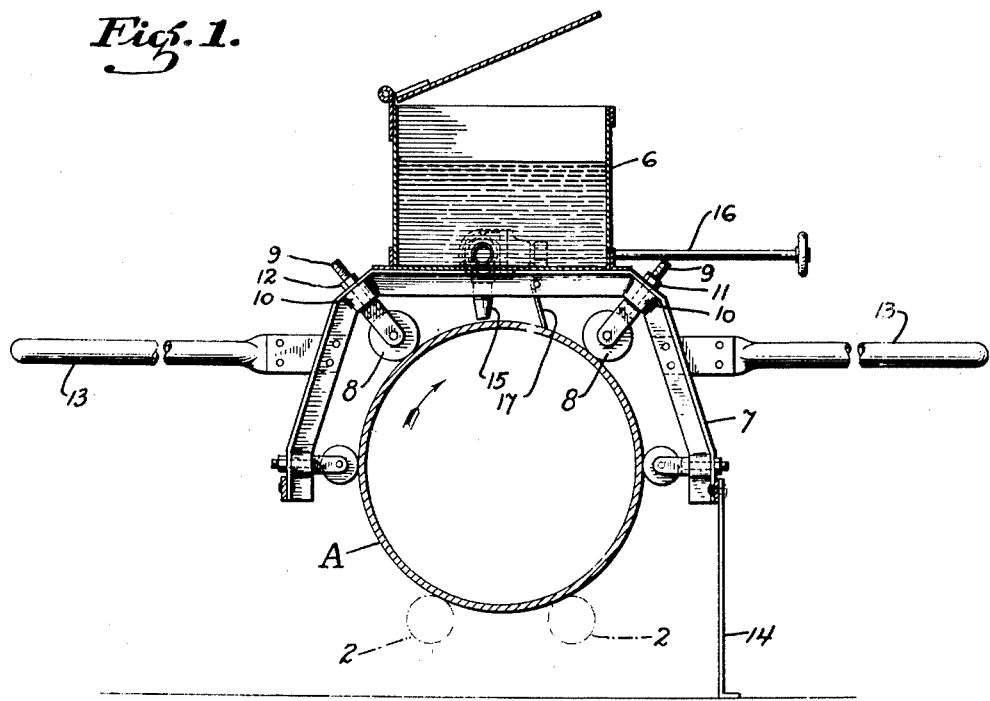
Fig. 1 is an end view of the invention applied to a pipe, which latter is presumably mounted for rotation.
Figure 2:
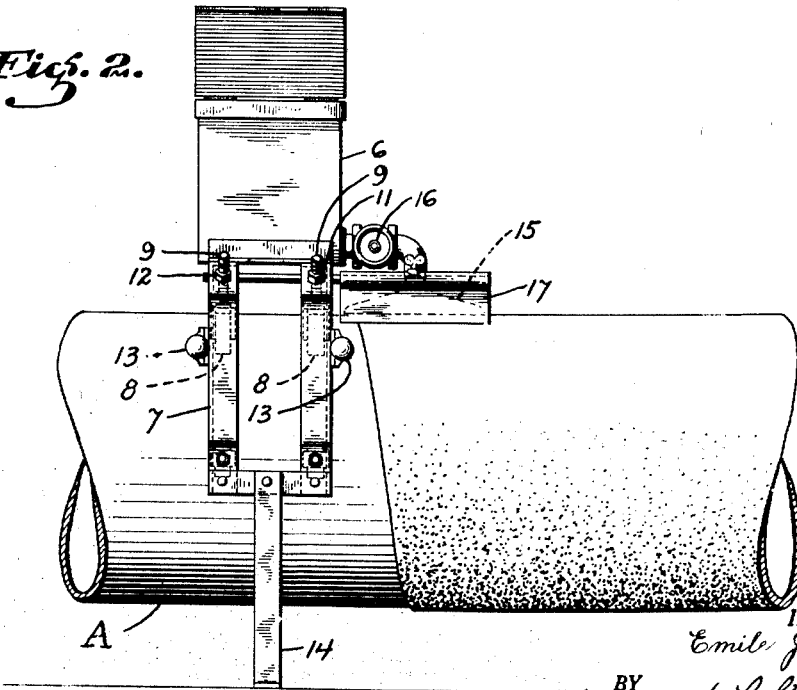
Fig. 2 is a side elevation of the apparatus illustrated in Fig. 1.

Having reference to the accompanying drawings, A represents a pipe section to be coated. One of these sections may be forty feet more or less in length and two feet more or less in diameter. The pipe is supported on rollers 2, appropriately mounted on a base 3. By revolving the rollers 2 through appropriate means, as a sprocket chain 4 and a crank 5, the pipe is made to revolve in the direction of the arrow.

The coating material, which, for example, is hot asphalt, is contained in a suitable reservoir which is mounted on a suitable carrier or saddle 7 which is adapted to straddle and ride upon the pipe A. This saddle 5 is fabricated from angle iron or other suitable metal shapes and is carried by suitable rollers 8 appropriately mounted on the pipe for angular adjustment in such a manner that when the pipe is revolved and the saddle is resting on the pipe and the rollers are properly inclined and the saddle is properly supported, the saddle, with its tank 6 filled with hot tar or plastic, will be made to travel longitudinally of the pipe and at a rate of speed depending upon the rate of revolution of the pipe 8 and the angular adjustment of the rollers.

As here shown, each roller has a threaded stem 9 passing through a bearing 10 in the saddle 7, with set-nuts 11—12 adapted to adjust the radial length of the stem 9 whereby the apparatus is fitted to pipes of different diameters and also by which the angularity of the rollers 8 may be varied. As this apparatus is intended for use over rough ground where a man is required to be on each side of the pipe to maintain the coating device in upright position I have shown a pair of handles 13. The operator on each side of the machine grasps the handle 13 and steadies it and aids in its propulsion, as will be later described.

14 is a prop or leg on one side of the apparatus by which the spreader can, on occasion, be rested on the ground and yet maintain substantially upright on the pipe as when the pipe has stopped rotating and it is desired to refill the reservoir 6 or for any other reason.

The discharge and spreading of the hot tar or plastic are accomplished as follows: From the rear end of the tank 6, and near the bottom thereof, extends a discharge nozzle 15, which discharge is controlled by a suitable valve operated by a valve stem 16. Immediately in the path of the flowing plastic discharged from the nozzle 15 is a spreader or squeegee 17, supported and arranged so as to spread evenly the plastic as the pipe is revolved. The traveling carriage or saddle 7 being disposed in front of the discharge nozzle 15 and squeegee 17, it is always out of the way of the spread material so that the rollers do not become fouled, nor do the rollers in turn interfere with the spreading. By giving the proper incline or pitch to the rollers 8 through the medium of the set screws 11—12 and turnable stem 9, the degree of travel of the carrier or saddle 8 is regulated to correspond with the speed of rotation of the pipe and insure a complete coating of the pipe.

The advantages of this apparatus are: A closed container of suitable size can be used, in which the material can settle and prevent bubbles and there will be no splash to burn the operator. A squeegee spreads the coating material uniformly and there is no burning of the operator's hands, as is the case where a hand rag, mat or brush is used. Greater speed is accomplished by this machine over the hand method, besides eliminating one operator.

The adjustable feed rollers 8 permit the same apparatus to be used on different sizes of pipe and for the same pipe to be given several coats, if desired.

It is manifest that various changes and alterations in the form and mechanical construction of the device may be made without departing from the spirit of my invention as disclosed in the appended claims.

What I claim is:

1. In a pipe coating machine, the combination with suitable means for revolving a pipe, of a coating device movably mounted thereon, said coating device having a container for the coating material and with a discharge outlet, a squeegee engaging the pipe and constituting a spreader to spread the material discharged as the coating device is moved longitudinally of the pipe.

2. In a pipe coating machine, the combination of means for revolving a pipe and a coating device cooperating therewith, said coating device comprising a saddle member mounted on rollers to rest upon the pipe, said saddle carrying a container for the plastic and a spreader for spreading the plastic over the pipe.

3. In a pipe coating machine, the combination of means for revolving a pipe and a coating device cooperating therewith, said coating device comprising a saddle member mounted on rollers to rest upon the pipe, said saddle carrying a container for the plastic and a spreader for spreading the plastic over the pipe, the rollers of said saddle being angularly adjustable so that the saddle is propelled longitudinally of the pipe as the later is revolved.

4. In a pipe coating machine, the combination with means for revolving a pipe, of a coating device cooperating therewith, said coating device embracing a container for the coating material, a squeegee, and means for supporting the coating device so that it can be moved longitudinally of the pipe and with the squeegee in contact with the pipe, said supporting means including rollers whereby the device may be rested upon the pipe, said rollers being radially adjustable to adapt the device to different diameters of pipe.

5. In a pipe coating machine, the combination of means for revolving a pipe and a coating device cooperating therewith, said coating device comprising a saddle member mounted on rollers to rest upon the pipe, said saddle carrying a container for the plastic, a spreader for spreading the plastic over the pipe, and handles on the saddle for supporting it and said saddle also having a leg extending toward the ground and normally out of contact with the ground, upon which leg the saddle may be supported on the pipe independent of the handles.

EMILE JANSEN.